United States Patent [19]
Shields

[11] Patent Number: 5,386,311
[45] Date of Patent: Jan. 31, 1995

[54] CLOCK RECOVERY

[75] Inventor: James A. Shields, Carrickfergus, United Kingdom

[73] Assignee: Northern Telecom Limited, Montreal, Canada

[21] Appl. No.: 118,928

[22] Filed: Sep. 9, 1993

[30] Foreign Application Priority Data

Sep. 9, 1992 [GB] United Kingdom ............... 9219127

[51] Int. Cl.$^6$ ............................................. H04B 10/06
[52] U.S. Cl. ................................. 359/189; 359/171; 359/158; 372/38
[58] Field of Search ............... 359/135, 154, 158, 162, 359/171, 189; 372/38; 250/214 A

[56] References Cited

U.S. PATENT DOCUMENTS

| | | | |
|---|---|---|---|
| 4,586,186 | 4/1986 | Anderson | 359/158 |
| 4,679,252 | 7/1987 | Holland | 455/619 |
| 4,805,235 | 2/1989 | Henni | 455/608 |
| 4,979,185 | 12/1990 | Bryans et al. | 359/158 |
| 5,007,070 | 4/1991 | Chao et al. | 359/158 |
| 5,063,567 | 11/1991 | Nakajima | 372/28 |

FOREIGN PATENT DOCUMENTS

WO92/20128 11/1992 WIPO .

OTHER PUBLICATIONS

Barnsley et al., "A 4×5 Gb/S Transmission System will All-Optical Clock Recovery", IEEE Photonics Technology Letter, vol. 4 No. 1, Jan. 1992, pp. 83–86.

Barnsley et al., "All-Optical Clock Recovery from 5 Gb/s RZ Data Using a Self-Pulsating 1.56 μm Laser Diode" IEEE Photonics Technology Letter, vol. 3, No. 10, Oct. 1992, pp. 942–945.

Barnsley et al., "Clock Extraction Using Saturable Absorption in a Semiconductor Nonlinear Optical Amplifier", IEEE Photonics Technology Letter, vol. 3, No. 9, Sep. 1991, pp. 832–834.

Primary Examiner—Herbert Goldstein
Assistant Examiner—Kinfe-Michael Negash
Attorney, Agent, or Firm—Lee, Mann, Smith, McWilliams, Sweeney & Ohlson

[57] ABSTRACT

Optical clock recovery is performed on an optical signal containing both data and clock information by applying it to a photodetector and adding part of the resulting electrical signal to the bias of a self-pulsating laser diode so as to force its pulsation frequency to the frequency and phase of the clock component of the optical signal.

7 Claims, 1 Drawing Sheet

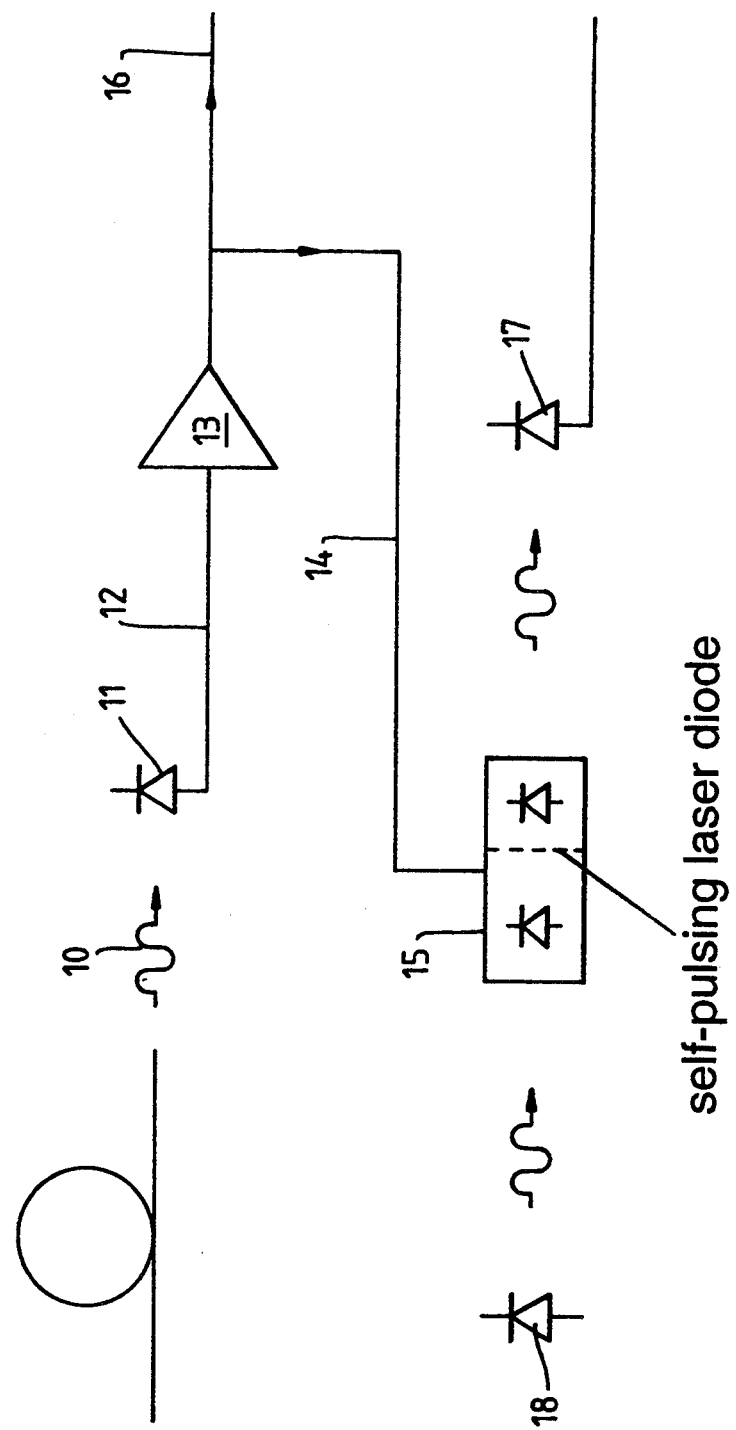

CLOCK RECOVERY

BACKGROUND OF THE INVENTION

This invention relates to optical clock recovery from a line signal containing both data and clock information.

The basic elements of any digital line transmission system consist of a transmitter and a receiver connected by a transmission medium. An example of such a system is the optical fibre digital line transmission system where the source transmitter is a laser, the receiver is a photodetector system and the transmission medium is the optical fibre. The digital line transmission signal must contain both data and clock information so that these signals may be properly reconstituted at the receiver. A method of achieving this is to encode the data signal, typically an NRZ signal, prior to transmission. An example of this is the 5B6B coding system often used for optical transmission or the CMI coding system often used for electrical transmission. This process ensures that the line transmission signal contains a clock component which can be recovered at the receiver where decoding also takes place to recover the data. Typically in prior art digital line transmission systems the receiver terminates the transmission line with a photodetector which provides a digital electrical representation of the line transmission signal. The transmission clock is typically extracted from this electrical signal, using a phase-locked loop (PLL) to synchronise the output of a local oscillator with the clock content of that signal to enhance the efficiency of this clock signal produced by the receiver's detector extraction process, the electric signal produced by the receiver's detector may be modified by differentiation and square law filtering to provide a modified signal with an enhanced power component at the clock frequency. A circuit to achieve this may contain many discrete components or be comprised of a custom device. In both instances the circuit is relatively expensive first to develop and then to produce. For use at high frequency bit rates the manufacture of large volumes of PLL-based clock extraction circuits can be costly in terms of setup required at the final stages of product test. Additionally each circuit has to be specifically designed for operation at a specific line transmission rate, with the result, for instance, that a clock extraction circuit for a 678 Mbit/s optical transmission system can not be used or adjusted to work in a 140 Mbit/s line transmission system. There are alternatives to the use of a local oscillator and phase-locked loop for electrical clock extraction, thus the electrical signal can be amplified and filtered using a high Q SAW filter, but these filters similarly have the disadvantage of being bit-rate specific.

As an alternative to all-electronic clock recovery from a detected optical clock signal, recovery can instead be achieved optically or opto-electronically using a self-pulsating laser diode (SPLD) or non-linear optical amplifier (NLOA) comprising an injection laser, diode typically a buried heterostructure laser diode, with a top contact divided into two parts which are independently powered respectively to provide a gain region and a self-absorption region optically in tandem. Thus P. E. Barnsley et. al., in a paper entitled "Clock Extraction Using Saturable Absorption in a Semiconductor Nonlinear Optical Amplifier" (IEEE Photonics Technology Letters Vol. 3, No. 9, Sept. 1991, pages 832-4), describe the use of one of these devices to recover an electrical clock signal from its saturable absorber contact when the optical signal is applied to its input facet. The paper explains, with particular reference to its FIG. 2, that the signal obtained directly from this contact requires to be filtered before it is usable as a clock signal, and hence this form of clock recovery, like the ones mentioned earlier, suffers from the problem that any particular implementation is bit-rate specific.

In two other papers by P. E. Barnsley et. al., respectively entitled "All-optical Clock Recovery from 5Gb/s RZ Data using a Self-Pulsating 1.56 um Laser Diode" (IEEE. Photonics Technology Letters Vol. 3, No. 10, Oct. 1991, pages 942-5) and "A 4×5 Gb/s Transmission System with All-Optical Clock Recovery" (Ibid. Vol. 4, No. 1, Jan. 1992, pages 83-86) there is described a method of clock recovery which is all-optical, and in which the need for electronic filtering is avoided because the filtering is performed optically by the action of the SPLD device itself. However a disadvantage of this approach is that clock recovery involves the taking of a significant proportion, typically 20%, of the optical power which would otherwise have been available for signal detection.

SUMMARY OF THE INVENTION

An object of the present invention is the provision of an opto-electronic system of clock recovery that allows the full received optical power at the receiver to be detected.

A further object of the present invention is the provision of an opto-electronic system of clock recovery in which the clock recovery can be effected without recourse to filtering in the electrical regime.

According to the present invention there is provided a receiver of a signal containing both data and clock information, in which receiver said signal is received in, or converted to, an electrical signal format and a part of said electrical signal is coupled to an electrical input of a frequency controllable semiconductor self-pulsating laser diode device to force its pulsation frequency and phase into registry with that of the clock component of the received signal.

The present invention further provides an optical clock recovery circuit for recovering an optical clock from a received optical signal containing both data and clock information, when circuit includes a photodetector for the application thereto of said received optical signal the electrical output of which photodetector is coupled to one electrical input of a frequency controllable semiconductor self-pulsating laser diode device.

The invention also provides a method of clock recovery from a line transmission signal containing both data and clock information wherein said line transmission signal is fed to a detector to provide an electrical output signal which is added to one input of a d.c. biased frequency controllable semiconductor self-pulsating laser diode.

BRIEF DESCRIPTION OF THE DRAWING

There follows a description of a circuit and method of optical clock recovery embodying the invention in a preferred form. The description refers to the accompanying drawing which is a block diagram of the circuit.

DETAILED DESCRIPTION OF THE PREFERRED EMBODIMENT

Referring to the accompanying drawing, at a receiver a received optical signal 10, which contains both data and clock information, is directed to a photodetector 11 to produce an electrical output signal on line 12 which contains both the data and the clock information. By way of example, the data may comprise an NRZ 565 Mbit/s signal converted using SB6B code conversion into a 678 Mbit/s signal containing both data and clock information. Line 12 is connected to the input of an amplifier 13 to provide an amplified signal, part of which is fed on line 14 to a self-pulsating laser diode 15, and part of which is fed on line 16 to another part (not shown) of the receiver in which the regenerated clock is employed to decode the signal to recover its data content, reshape it and retime it. The self-pulsating laser diode 15 has dc bias currents applied to its gain and absorption contacts with values chosen to provide a free running pulsation frequency close to the line transmission bit rate of 678 MHz. The signal on line 14 is added to this bias. Its amplitude is adjusted so that it is large enough to force the frequency of pulsation, but not so large as to replace its regular pulsation with the coded optical data signal In a particular example, the signal was applied to the gain contact to phase-lock the pulsations to the clock content of the signal on line 14 and thus produce an output optical clock signal applied to a photodetector 17 providing an electrical clock signal with a power spectrum approximately 28dB above the electrical noise floor. An improvement on this figure was obtained by injecting a monomode CW optical signal from a laser 18 into the opposite end of the self-pulsating laser diode so as to cause its optical output to injection mode lock. The use of such a laser is optional.

I claim:

1. An optical clock recovery circuit for recovering an optical clock from a received optical signal containing both data and clock information, said circuit including a photodetector for the application thereto of said received optical signal, said photodetector including means for generating an electrical output, and including signal coupling means for coupling said electrical output to one electrical input of a frequency controllable semiconductor self-pulsating laser diode device.

2. An optical clock recover circuit as claimed in claim 1, wherein a d.c. operated single mode laser source is optically coupled with the self-pulsating laser diode.

3. An optical clock recovery circuit as claimed in claim 1, wherein the output of the self-pulsating laser diode is optically coupled with a further photodetector.

4. An optical clock recovery circuit as claimed in claim 3, wherein a d.c. operated single mode laser source is optically coupled with the self-pulsating laser diode.

5. A receiver of a signal containing both data and clock information, said receiver including means for receiving said signal and transducer means for converting said signal to an electrical signal format if received in a non-electrical signal format and including signal coupling means for coupling a part of said electrical signal to an electrical input of a frequency controllable semiconductor self-pulsating laser diode device to force its pulsation frequency and phase into registry with that of the clock information of the received signal.

6. A method of clock recovery from a line transmission signal containing both data and clock information including the steps of feeding said line transmission signal to a detector, generating an electrical output signal, and adding said electrical output signal to one input of a d.c. biased frequency controllable semiconductor self-pulsating laser diode.

7. A method of recovering an optical clock from an optical signal containing both data and clock information including the steps of feeding said optical signal to a detector, generating an electrical output signal, and adding said electrical output signal to one input of a d.c. biased frequency controllable semiconductor self-pulsating laser diode.

* * * * *